Patented Sept. 20, 1932

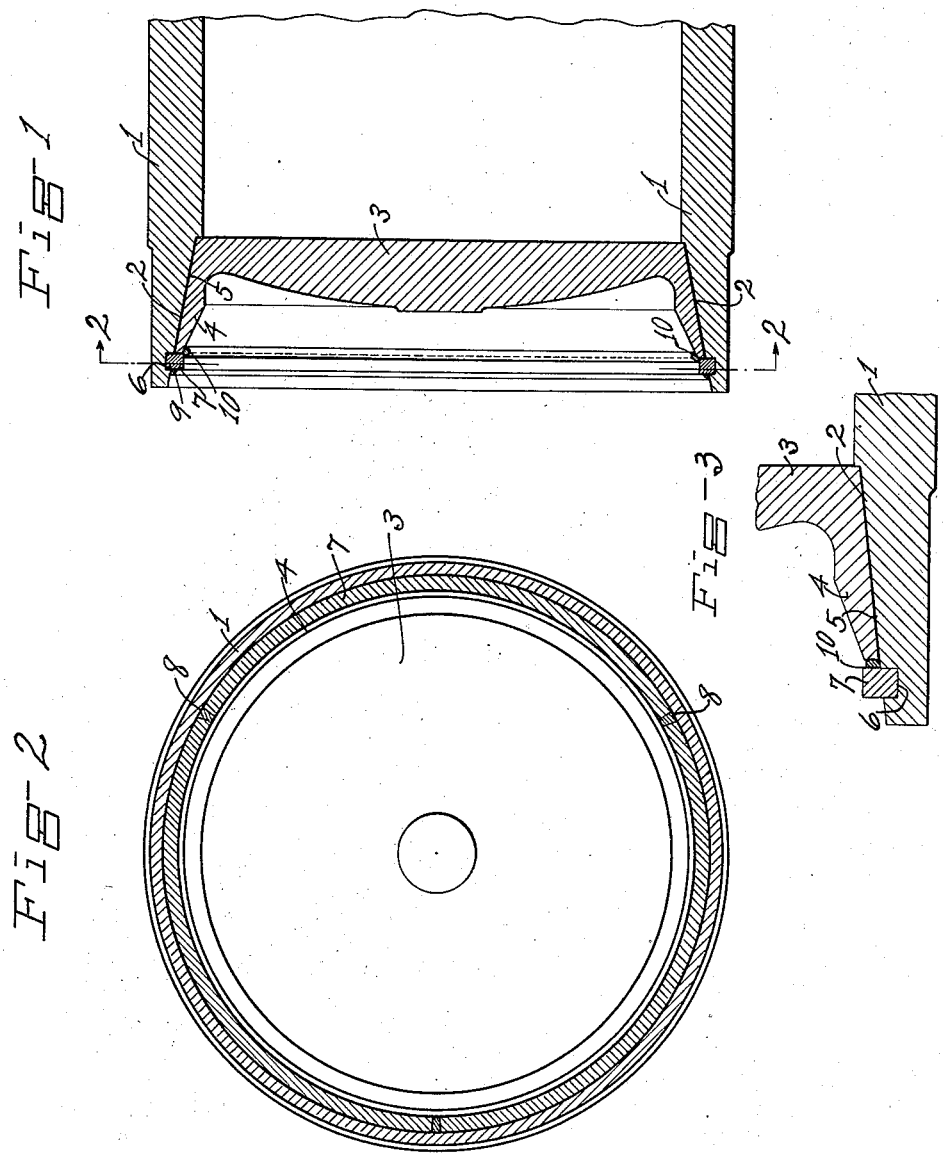

1,878,709

UNITED STATES PATENT OFFICE

HOWARD J. KERR, OF WESTFIELD, NEW JERSEY, ASSIGNOR TO THE BABCOCK & WILCOX COMPANY, OF BAYONNE, NEW JERSEY, A CORPORATION OF NEW JERSEY

DRUM FOR VAPORS UNDER PRESSURE

Application filed September 25, 1928. Serial No. 308,322.

This invention relates to a device that is suitable for withstanding internal pressures of hot vapors. It comprises a cylinder with a removable head that permits expansion and contraction with temperature changes and is maintained permanently tight. The invention is especially suitable as a drum for a mercury boiler, but is not restricted to this particular use. The invention will be understood from the description in connection with the accompanying drawing in which Fig. 1 is a longitudinal section through one end of the drum; Fig. 2 is a section along the line 2—2 of Fig. 1; and Fig. 3 is a section on an enlarged scale showing some of the details.

In the drawing, reference character 1 indicates a cylindrical drum subjected to internal pressure of hot vapors. The end of the drum is beveled on the inside as shown at 2, and a head 3 is inserted in the end of the drum. The head 3 is provided with a sloping annular flange 4 with a beveled surface 5 corresponding to the surface 2 of the drum 1.

An annular groove 6 is provided on the inside of the beveled portion of the drum 1 near the end of the drum and a ring 7, preferably square in cross section, is placed in the groove 6. The ring 7 may be made up of sections that are inserted separately and the ends thereof may be afterward welded together as indicated at 8. The edge of the flange 4 may rest against the ring 7 so that the ring takes the thrust due to pressure inside of the drum and prevents the head 3 from being displaced. The outer edge of the ring 7 may be welded by an annular weld 9 to the outside edge of the groove 6, and the inner edge of the ring 7 welded by an annular weld 10 to the thin edge of the flange 4 of the head 3, thus providing a gas tight joint as shown in Fig. 1. The same result may be secured by welding the thin edge of the head flange 4 directly to the drum inside of the thrust ring 7 and incidentally to the ring as shown in Fig. 3.

The flange 4 is flexible so that the drum 1 and the head 3 may expand to different extents, especially radially, without causing injury to the weld metal at the joint between the two which would cause a leak. The joint is especially suitable for maintaining tightness under varying internal pressures and temperatures because the weld is made at the thrust ring and the weld metal itself is not damaged by over stressing because of the pressure or the temperature effects on the metal structure of the drum 1 and head 3. When this device is used as a drum for a mercury boiler, the usual depending tubes in which the mercury vapors are generated, can be attached and inlets for mercury and outlets for mercury vapors can be provided in the usual way.

I claim:

1. A drum and end closure therefor, the two having annular engaging walls with co-operating surfaces, a recess in the drum annulus exteriorly of the closure and having surfaces normal to the axis of the drum, a ring seated in said recess and receiving outward thrust of the closure, and welding uniting the drum, closure and ring in vapor-tight relation.

2. A drum and end closure therefor, the two having annular engaging walls with co-operating beveled surfaces, the beveled surfaces of the closure being attenuated to impart flexibility, a recess in the drum annulus exteriorly of the closure and having surfaces normal to the axis of the drum, a ring seated in said recess and receiving outward thrust of the closure, and welding uniting the drum, closure and ring in vapor-tight relation.

3. A drum and end closure therefor, the two having attenuated annular engaging walls, with cooperating beveled surfaces, a recess in the drum annulus exteriorly of the closure and having surfaces normal to the axis of the drum, a ring seated in said recess and receiving outward thrust of the closure, and welding uniting the drum, closure and ring in vapor-tight relation.

4. A pressure drum and end closure therefor, the two having annular engaging surfaces, a recess in the drum annulus exteriorly of the closure, a ring formed of multi-parts and seated in said recess then integrally connected by welding and receiving the outward thrust of the closure, and welding uniting the drum, closure and ring in vapor-tight relation.

5. A drum and end closure therefor, the two having annular engaging walls with cooperating beveled surfaces, a recess in the drum annulus exteriorly of the closure, a ring formed of multi-parts and seated in said recess then integrally connected by welding and receiving the outward thrust of the closure, and welding uniting the drum, closure and ring in vapor-tight relation.

6. A pressure drum and end closure therefor, the two having inclined cooperating engaging surfaces, the closure increasing in diameter from the inside out, a recess in the drum annulus exteriorly of the closure, a ring formed of multi-parts and seated in said recess then integrally connected by welding and receiving the outward thrust of the closure, and welding uniting the drum, closure and ring in vapor-tight relation.

7. A drum and end closure therefor, the two having annular engaging walls with cooperating beveled surfaces, a recess in the drum annulus exteriorly of the closure and having surfaces normal to the axis of the drum, a ring formed of multi-parts and seated in said recess then integrally connected by welding and receiving outward thrust of the closure, and welding uniting the drum, closure and ring in vapor-tight relation.

8. A drum and end closure therefor, the two having annular engaging walls with cooperating beveled surfaces, the beveled surfaces of the closure being attenuated to impart flexibility, a recess in the drum annulus exteriorly of the closure and having surfaces normal to the axis of the drum, a ring formed of multi-parts and seated in said recess then integrally connected by welding and receiving outward thrust of the closure, and welding uniting the drum, closure and ring in vapor-tight relation.

9. A drum and end closure therefor, the two having attenuated annular engaging walls, with cooperating beveled surfaces, a recess in the drum annulus exteriorly of the closure and having surfaces normal to the axis of the drum, a ring formed of multi-parts and seated in said recess then integrally connected by welding and receiving outward thrust of the closure, and welding uniting the drum, closure and ring in vapor-tight relation.

HOWARD J. KERR.